(12) United States Patent
Niu et al.

(10) Patent No.: US 12,232,193 B2
(45) Date of Patent: Feb. 18, 2025

(54) SYSTEMS AND METHODS FOR CELL SELECTION AND RESELECTION

(71) Applicant: ZTE Corporation, Shenzhen (CN)

(72) Inventors: Li Niu, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 369 days.

(21) Appl. No.: 17/345,263

(22) Filed: Jun. 11, 2021

(65) Prior Publication Data

US 2021/0306921 A1    Sep. 30, 2021

Related U.S. Application Data

(63) Continuation of application No. PCT/CN2019/070832, filed on Jan. 8, 2019.

(51) Int. Cl.
| | |
|---|---|
| *H04W 76/11* | (2018.01) |
| *H04W 36/30* | (2009.01) |
| *H04W 48/16* | (2009.01) |
| *H04W 48/20* | (2009.01) |
| *H04W 84/04* | (2009.01) |

(52) U.S. Cl.
CPC ............ *H04W 76/11* (2018.02); *H04W 36/30* (2013.01); *H04W 48/16* (2013.01); *H04W 48/20* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2013/0077515 A1* | 3/2013 | Jung | H04W 48/20 370/252 |
| 2013/0095879 A1 | 4/2013 | Gupta et al. | |
| 2015/0056925 A1* | 2/2015 | Jung | H04W 24/10 455/67.11 |
| 2015/0109918 A1* | 4/2015 | Sharma | H04W 36/0055 370/280 |
| 2015/0249951 A1* | 9/2015 | Jung | H04W 8/186 455/435.1 |
| 2015/0304919 A1 | 10/2015 | Jung et al. | |
| 2017/0064598 A1 | 3/2017 | Jain et al. | |
| 2020/0053620 A1* | 2/2020 | Kim | H04W 16/14 |

(Continued)

FOREIGN PATENT DOCUMENTS

| | | |
|---|---|---|
| CN | 101815330 A | 8/2010 |
| CN | 103988549 A | 8/2014 |

(Continued)

OTHER PUBLICATIONS

Extended European Search Report for European Patent Application No. 19908581.2 dated Apr. 20, 2022, 12 pages.

(Continued)

*Primary Examiner* — Anh Vu H Ly

(74) *Attorney, Agent, or Firm* — Crowell & Moring LLP

(57) ABSTRACT

This disclosure relates generally to wireless communications. In one embodiment, a method performed by a communication device includes: receiving information from a first communication node; and decreasing a probability of selecting a second communication node, in communication node selection or reselection, in response to the information indicating a condition.

10 Claims, 3 Drawing Sheets

(56) References Cited

U.S. PATENT DOCUMENTS

2020/0221372 A1\* 7/2020 Shih .................. H04W 72/0453
2021/0345210 A1\* 11/2021 Chen .............. H04W 36/00835

FOREIGN PATENT DOCUMENTS

| CN | 104025655 A | 9/2014 |
| CN | 106488492 A | 3/2017 |
| CN | 107852672 A | 3/2018 |
| RU | 2526887 C2 | 8/2014 |
| WO | WO 2012/176010 A2 | 12/2012 |

OTHER PUBLICATIONS

Russian Office Action with English Translation for Russian Patent Application No. 2021120033/07(042052) dated Apr. 27, 2022, 14 pages.
Russian Search Report with English Translation for Russian Patent Applicatior No. 202112003/07(042052) dated Apr. 26, 2022, 4 pages.
ZTE, The impact of non-best cell on cell reselection for NR-U, 3GPP TSG-RAN WG2 meeting #104 (R2-1816834), Washington, USA, Oct. 31, 2018 (found on Apr. 26, 2022), found in Internet https://www.3gpp.org/DynaReport/TDocExMtg--R2-104--18808.htm.
ZTE, The impact of multiple operators on cell selection for NR-U, 3GPP TSG-RAN WG2 meeting #103bis (R2-1813739), Chengdu, China, Sep. 27, 2018 (found on Apr. 26, 2022), found in Internet https://www.3gpp.org/DynaReport/TDocExMtg--R2-103b--18803.htm.
LG Electronics, Reading MIB/SIB1 from non-best cells, 3GPP TSG-RAN WG2 Meeting #104 (R2-1818329) Spokane, USA, Nov. 2, 2018 (found on Apr. 26, 2022), found in Internet https://www.3gpp.org/DynaReport/TDocExMtg--R2-104--18808.htm.
Mediatek Inc., Cell Selection and Reselection in NR-U, 3GPP TSG-RAN2#104 meeting Tdoc (R2-1816480), Spokane, USA, Nov. 1, 2018 (found on Apr. 26, 2022), found in Internet https://www.3gpp.org/DynaReport/TDocExMtg--R2-104--18808.htm.
Chinese Office Action with English Translation for Chinese Patent Application No. 202210376918.0 dated Feb. 22, 2023, 9 pages.
International Search Report and Written Opinion of the International Searching Authority for International Patent Application No. PCT/CN2019/070832 dated Oct. 22, 2019; 6 pages.
Chinese Office Action with English Translation for Chinese Patent Application No. 202210376918.0 dated Dec. 6, 2022, 17 pages.
Indian Office Action with English Translation for Indian Patent Application No. 202117023901 dated Feb. 15, 2023, 9 pages.
Singaporean Office Action for Singaporean Patent Application No. 11202105546W dated Jul. 17, 2023, 7 pages.
Korean Office Action with English Translation of Summary of Office Action for Korean Patent Application No. 10-2021-7016368 dated Dec. 29, 2023, 7 pages.
Communication Pursuant to Art. 94 (3) EPC issued in European Patent Application No. 19 908 581.2 dated Aug. 7, 2024, 7 pages.

\* cited by examiner

SYSTEMS AND METHODS FOR CELL SELECTION AND RESELECTION

CROSS-REFERENCE TO RELATED APPLICATION

This application is a continuation application of PCT International Patent Application No. PCT/CN2019/070832, filed with the China National Intellectual Property Administration, PRC on Jan. 8, 2019, which is herein incorporated by reference in its entirety.

TECHNICAL FIELD

This disclosure relates generally to wireless communications.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

In an idle or inactive mode, before user equipment (UE) accesses a cell, the UE may try to perform a cell selection procedure or a cell reselection procedure. Reference to a cell may refer to more specifically a base station (BS) with a coverage area. Also, for ease of discussion, reference to both cell selection and cell reselection may be referred to more simply as cell selection/reselection. With cell selection/reselection, the UE may search for a suitable cell in accordance with the UE's associated public land mobile network (PLMN). The UE may then a cell with the UE's PLMN to provide available services and the UE will then monitor the cell's control channel. However, current techniques for cell selection/reselection are limited and may not have sufficient flexibility to accommodate $5^{th}$ generation (5G) New Radio (NR) based communications.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: receiving information from a first communication node; and decreasing a probability of selecting a second communication node, in communication node selection or reselection, in response to the information indicating a condition.

In one embodiment, a method performed by a first communication node includes: sending information to a communication device, wherein the communication device is configured to decrease a probability of selecting a second communication node, in communication node selection or reselection, in response to the information indicating a condition.

In one embodiment, a communication device includes: a transceiver configured to: receive information from a first communication node; and a processor configured to: decrease a probability of selecting a second communication node, in communication node selection or reselection, in response to the information indicating a condition.

In one embodiment, a first communication node includes: a transceiver configured to: send information to a communication device, wherein the communication device is configured to decrease a probability of selecting a second communication node, in communication node selection or reselection, in response to the information indicating a condition.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
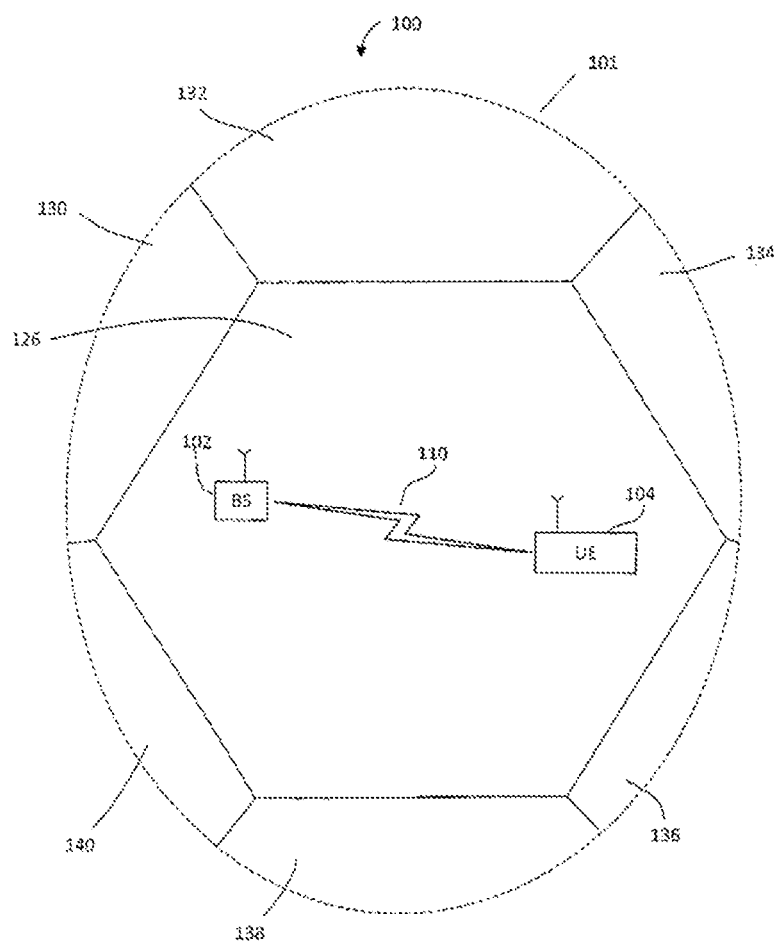
FIG. 1 illustrates an exemplary wireless communication network in which techniques disclosed herein may be implemented, in accordance with some embodiments.

FIG. 1 illustrates an exemplary wireless communication network 100 in which techniques disclosed herein may be implemented, in accordance with some embodiments. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a reference to a BS with an associated coverage area or region. In certain embodiments, a cell may be interchangeably referred to as a BS or a node as each BS or node inherently has a coverage area.

For example, the BS 102 may operate at an channel transmission bandwidth (e.g., spectrum) to provide adequate coverage to each UE 104. The spectrum may be regulated to define a licensed range and/or an unlicensed range. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
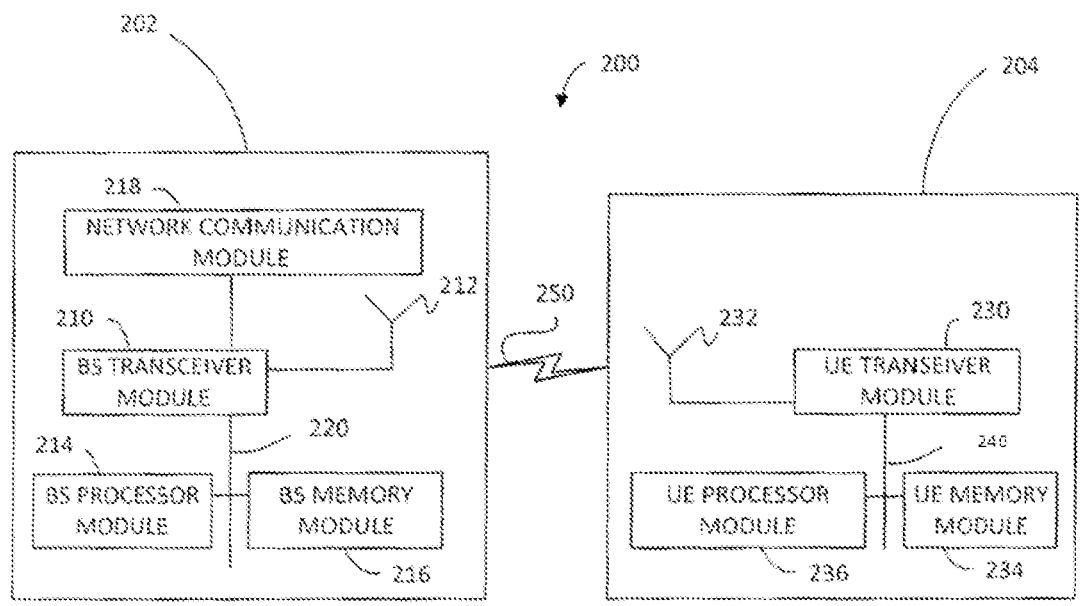
FIG. 2 illustrates a block diagram of an exemplary wireless communication system for transmitting and receiving wireless communication signals, in accordance with some embodiments.

FIG. 2 illustrates a block diagram of an exemplary wireless communication system 200 for transmitting and receiving wireless communication signals (e.g., OFDM/OFDMA signals) in accordance with some embodiments. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may include a RF transmitter and receiver circuitry that are each coupled to the antenna 232. A duplex switch (not shown) may alternatively couple the transmitter or receiver to the antenna 232 in time duplex fashion. Similarly, in accordance with some embodiments, the BS transceiver module 210 may include RF transmitter and receiver circuitry that are each coupled to the antenna 212. A duplex switch may alternatively couple the transmitter or receiver to the antenna 212 in time duplex fashion. The operations of the two transceiver modules 210 and 230 are coordinated in time such that the receiver is coupled to the antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be a next generation node B (gNB), a serving gNB, a target gNB a femto station, or a pico station, or a satellite for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

The demand for spectrum is increasing with the rapid growth of user data. However, the licensed spectrum is limited. Moreover, the cost of operation for the licensed spectrum is relatively high in comparison to the unlicensed spectrum. Also, the unlicensed spectrum has more band options (e.g., bandwidth) than the licensed spectrum.

However, since the unlicensed spectrum is a sharing spectrum, UEs generally compete with each other to gain channel access in the unlicensed spectrum. For example, UEs may need to preempt the spectrum before sending their user data. If preemption succeeds, the UE can send the user data. Otherwise, the UE may need to continue efforts at preemption until success. The $3^{rd}$ Generation Partnership Project (3GPP) and European Telecommunications Standards Institute (ETSI) standard organizations have introduced a "Listen Before Talk" (LBT) mechanism to regulate preemption. Under LBT, before sending data, the sender listens or senses whether the channel is idle or busy. If the channel is idle, the sender can use the channel to send data. Otherwise, the sender cannot send data.

In the unlicensed spectrum, LBT mechanisms may cause contention and unreliable transmissions. If a UE selects and tries to access a cell with intense contention, difficulties such as receiving system information and transmitting preambles may block access to such a contended cell. Accordingly, the probability to access to the contended cell successfully may be relatively low when there is contention. Also, even if the UE accesses to the cell successfully, service quality may not be guaranteed due to the contention. Hence, a UE may generally attempt to not select the cell with intense contention. Current techniques of cell selection/reselection may not give special consideration to this kind of cell in cell selection/reselection. Thus, a UE may attempt to select to such a cell with intense contention.

Moreover, the unlicensed spectrum allows the for unplanned developments, such as multiple operators with different public land mobile network (PLMN) that may share a common frequency. In other words, in a frequency, there may be multiple cells associated with different PLMNs. A UE may only select the cell that belongs to the PLMN associated with the UE. The UE may obtain system information (including the PLMN information) when the UE camps on a cell. Thus, the UE may determine when a cell does not belong to the registered PLMN or equivalent PLMN (E-PLMN) of the UE. When the cell does not belong to the registered PLMN or equivalent PLMN (E-PLMN) of the UE, the UE may bar such a cell and exclude this cell from the candidate cells for cell selection/reselection. But, there may be many other cells that share the frequency of the barred cell. Thus, the UE may expend much time and power to read the system information of those cell one by one in order to find the cell that belongs to the registered PLMN or equivalent PLMN (E-PLMN). Hence, new techniques may be introduced to help a UE find a suitable cell for cell selection or reselection.

The unlicensed spectrum has flexible networking, such as an adhoc network. In an adhoc network, an operator may use a random physical layer cell identifier (PCI) for a cell. However, such usage of the PCI may increase the likelihood of PCI collisions due to the unregulated usage of PCI among operators. Also, a UE may detect a PCI, but may not be able to distinguish the related cell and the associated public land mobile network (PLMN). Also, in cell selection/reselection, reading of system information to obtain the cell identity or PLMN information may undesirably strain the resources of a UE.

Figure 3:
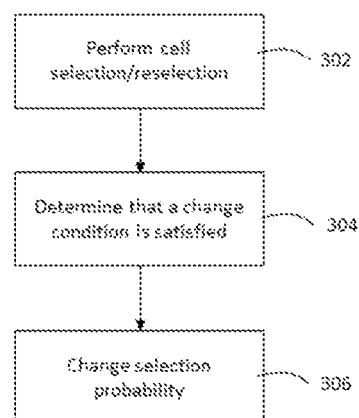
FIG. 3 is a block diagram of a cell selection/reselection process in accordance with some embodiments.

Accordingly, systems and methods in accordance with various embodiments introduce techniques for cell selection/reselection. FIG. 3 is a block diagram of a cell selection/reselection process 300, in accordance with some embodiments. The process 300 may be performed by a UE. It is noted that the process 300 is merely an example, and is not intended to limit the present disclosure. Accordingly, it is understood that additional operations (e.g., blocks) may be provided before, during, and after the process 300 of FIG. 3, certain operations may be omitted, certain operations may be performed concurrently with other operations, and that some other operations may only be briefly described herein.

At operation 302, a UE operating in an idle mode or an inactive mode may perform cell selection/reselection. For simplicity of explanation, reference to both the idle mode and the inactive mode may be referred to as an idle/inactive mode. In the idle/inactive mode, the UE may perform measurements for cell selection/reselection purposes regularly. For example, the UE may select a suitable cell based on RRC_IDLE or RRC_INACTIVE state measurements and cell selection/reselection criteria (e.g., criteria that dictates when a UE will select a suitable cell).

In certain embodiments, performing cell selection/reselection may refer to the UE searching for a suitable cell in accordance with the UE's selected public land mobile network (PLMN) (e.g., associated with the UE). The UE may then select a cell with the UE's PLMN to provide available services and monitor the cell's control channel. The condition of using a cell to provide available service as well as monitoring the cell's control channel may also be referred to as camping on a cell. When camped on a cell, the UE may regularly search for, measure other cells, and treat them as candidate cells according to the cell selection/reselection criteria. If a better cell is found, UE may select to it. That better cell may then be selected in turn and camped on in accordance with the cell selection/reselection criteria.

At operation 304, the UE may determine that a change condition is satisfied for a candidate cell. Examples of various change conditions are provided below. These change conditions may be satisfied as based on selection information. Selection information may be received from the cell that UE camps on while the UE is in the idle/inactive mode. Selection information may be any information utilized to determine whether the UE should camp on a candidate cell. The selection information may include system information for the cell and/or may indicate the PLMN information for the cell (e.g., as a PLMN identifier) that UE camps on. As a more specific example, the selection information may include system information for the candidate cell and/or may indicate the PLMN information for the candidate cell (e.g., as a PLMN identifier). A selection probability for the candidate cell may be changed when the change condition is satisfied.

In certain embodiments, a change condition may be satisfied for the candidate cells in the frequency of the cell when the PLMN information is mismatched between a UE and a cell that UE camps on. For example, a UE may compare the PLMN information (e.g., PLMN identifier value) of the particular cell that UE camps on to the PLMN information (e.g., PLMN identifier value) of the UE to determine whether the PLMN information matches. The change condition may be satisfied for the candidate cells in the frequency of this particular cell when the PLMN information does not match.

In additional embodiments, when a transmission of either a random access channel (RACH), scheduling request (SR), physical uplink control channel (PUCCH), or physical uplink shared channel (PUSCH) fails due to a listen before talk (LBT) failure in a particular cell that UE connected to, a change condition for the candidate cells in the frequency of this particular cell may be satisfied. In further embodiments, when a radio link failure (RLF) is triggered due to a LBT failure in a particular cell that UE connected to, a change condition for the candidate cells in the frequency of this particular cell may be satisfied. In further embodiments, when measurement results reflecting the interference strength or channel occupancy ratio in a particular frequency or a particular cell are high enough (e.g., meets a threshold), a change condition for the candidate cells in the frequency may be satisfied. In further embodiments, when intense contention happens in a particular frequency or a particular cell, a change condition for the candidate cells in the frequency may be satisfied.

At operation 306, the UE may change a selection probability for candidate cells that satisfy the conditions in response to change condition satisfaction associated with the candidate cell. This change in selection probability may decrease a probability of selecting the candidate cell in response to satisfying a change condition. Or, this change in selection probability may increase a probability of selecting the other candidate cells in response to satisfying a change condition. For example, the change in selection probability may include applying an offset value to a criteria value associated with the candidate cell that satisfies conditions to produce an offset criteria value. In various embodiments, the criteria value may be any type of value utilized to determine whether to camp on a candidate cell. For example, the criteria value may be a priority of a frequency associated with the candidate cell, as will be discussed further below. As another example, the criteria value may be a cell ranking criteria, an inter-frequency or inter radio access technology communication node selection criteria, or an inter-frequency or inter radio access technology communication node measurement criteria.

In certain embodiments, the offset value may be part of the selection information. For example, the offset value may be provided by the candidate cell directly to be applied to the criteria value in a predetermined manner. Application of the offset value may represent any type of mathematical operation upon the criteria value, such as the application of a factor (e.g., multiplication by the offset value) a scalar (e.g., addition by the offset value) or an equivalence (e.g., setting the offset criteria value to a particular offset value). Also, the criteria value may also be part of the selection information. For example, the criteria value may be provided directed by the candidate cell as an absolute priority value.

Accordingly, the offset criteria value may be used by the UE to determine whether to camp on the candidate cell or not to camp on the candidate cell. For example, the offset criteria value may indicate to the UE that another cell is more suitable for the UE than the candidate cell. Alternatively, the offset criteria value may indicate to the UE that the candidate cell is the most suitable cell for the UE (e.g., where the offset criteria value for the most suitable candidate cell is the most extreme among a group of candidate cells). Thus, the UE may then camp on the candidate cell.

Accordingly, the offset criteria value may be performed (e.g., implemented) for a maximum of a predetermined configured time. For example, the offset may be effective during a configured time.

In various embodiments the UE may receive an instruction signal from the communication node to read system information of a neighboring communication node. This may be due to, for example, a previously detected physical layer cell identifier collision, and a previously detected frequency collision among public land mobile networks. In certain embodiments, the UE may be configured to determine an anchor frequency resource based on a total number of paging frames associated and/or a number of paging occasions associated with the UE. Also, the UE may determine whether a frequency resource is to be used for paging among a predetermined set of possible frequency resources for paging in a sequential manner starting with the anchor frequency resource.

In accordance with first exemplary embodiments, in an idle/inactive mode, a UE may detect and measure cells at supported frequencies. When the UE detects a cell, the UE may deem the cell as a candidate cell for cell selection/reselection. During cell selection/reselection, the UE may rank the candidate cells. The UE may camp on and read the system information of the highest ranked cell. Also, in certain embodiments, the UE may not consider or bar a particular cell that UE camps on (e.g., based on a maximum selection/reselection time of, for example, 300 seconds) if the PLMN indicated in the system information of the particular cell does not belong to the registered PLMN or equivalent PLMN (E-PLMN) of the UE. However, such handling by simply not considering or barring a cell may be based on the assumption that multiple operators rarely share a common frequency. This may not necessarily be the case in certain network implementations. When there are multiple operators in this frequency, although a UE may bar the particular cell, the UE may still have to read the system information of other candidate cells one by one in order to find the cell that belongs to the registered PLMN or equivalent PLMN (E-PLMN) of UE. This may consume much time and power. If the UE bars candidate cells in a particular frequency, the UE may then have no chance to select a cell that belongs to the registered PLMN or equivalent PLMN (E-PLMN) of UE in that particular frequency. Hence, some new techniques may be introduced to help the UE to find the suitable cell.

In various embodiments, a UE may fail to complete a radio resource control (RRC) procedure if the UE selects a cell with intense contention. For example, in the particular cell that the UE selects, the UE may start a timer when triggering a RRC procedure, such as RRC setup procedure. The RRC procedure may be considered to be a failure if the RRC procedure is not completed successfully before the timer expires. Then, based on the RRC failure, the UE may perform cell selection/reselection. Stated another way, RRC failure may occur once, or several consecutive times in certain embodiments. In this situation, in a cell selection/reselection procedure, the UE may lower the priority of the particular cell where a RRC procedure is triggered, in order to avoid the another attempt to access to this cell. However, if the UE only lowers the priority of the particular cell, the UE may still select a candidate cell in the same frequency with the particular cell. Thus, a failure may happen again due to the intense contention and consume much time and power. Hence, some new techniques may be introduced to help a UE to find a suitable cell.

In various embodiments, a UE may suffer from intense contention if the UE selects a cell with intense contention. If the UE fails to transmit UL signals in the particular cell that the UE selects, cell selection/reselection procedure may be initiated. For example, in the particular cell that the UE selects, when LBT fails for the transmission of UL signals including preamble, SR, PUCCH, PUSCH, and the like, the quantity of failures may reach a threshold that is configured by the cell. Then, the UE may receive an indication about of UL transmission failure. In certain embodiments, the UE may receive this indication in the same cell several times. Thus, RLF or a cell selection/reselection procedure may be triggered. In order to avoid another attempt to access the candidate cells in the same frequency with the particular cell, some new techniques may be introduced to help a UE to find a suitable cell.

In various embodiments, a UE may discover intense contention or strong interference. If the UE discovers a high probability of LBT failure of DL signals or strong interference or great difficulty to get access to a the particular cell that the UE selects, a cell selection/reselection procedure may be initiated. For example, when the UE measures the particular cell that UE selects, the measurement results may reflect the LBT failure ratio or interference strength or channel occupancy ratio in the particular cell or the frequency of the particular cell. In certain embodiments, the measurement results may be high enough to reach a configured threshold (e.g., the measurement results may meet a configured threshold) to trigger RLF or a cell selection/reselection procedure. In order to avoid another attempt to access to the candidate cells in a same frequency, some new techniques may be introduced to help a UE to find a suitable cell.

In various embodiments, in a cell selection/reselection procedure, the UE may lower the priority of the candidate cells for selection/reselection. This changing selection/reselection operation may be performed for a maximum of a predetermined configured time.

In various embodiments, the UE may ascribe a lowest ranking to the candidate cells on the same frequency as a particular cell.

In various embodiments, a cell (e.g., a BS or a gNB) may broadcast a factor together with an absolute priority for a frequency. This factor may be an offset value used for adjusting the priority of a frequency. Accordingly, the priority of the frequency can be lowered to be a value determined by the factor (e.g., offset value) and an absolute priority. For example, the UE may lower the priority of candidate cells for selection/reselection by the offset value so that their priority is adjusted to a new priority due to an applied offset. Also, the UE may lower the priority or ranking of the candidate cells on the same frequency as a particular cell based on the lowered priority of the frequency priority of the particular cell. In various applications, the application of the value may be obtained by the factor, such that the value may be equivalent to the offset value multiplied by the absolute priority or the offset value added to the absolute priority.

In various embodiments, a cell (e.g., a BS or a gNB) may broadcast a second priority together with an absolute priority for a frequency. This second priority may be value used for adjusting the priority of a frequency. Accordingly, the priority of the frequency can be lowered to be a value determined by the second priority. For example, the UE may lower the priority of the candidate cell for selection/reselection by the second priority so that the priority of the candidate cell is adjusted based on the second priority. Also, the UE may lower the priority or ranking of the candidate cells on the same frequency as the particular cell based on the second priority.

In various embodiments, a cell (e.g., a BS or a gNB) may broadcast a offset value. This offset value may be applied to a cell ranking criteria value, based on which the UE may determine to select or rank candidate cells. And the cell ranking criteria value may be calculated based on a measurement quality, hysteresis value, offset and/or temporary offset. In order to decrease the priority of candidate cells in the same frequency with a particular cell, the UE may decrease the priority of the candidate cells in the same frequency by an offset value applied to a cell-ranking criteria value used in cell selection/reselection. For example, the cell-ranking criteria value may be related to a cell-ranking criterion and the offset value may be applied to the cell-ranking criteria value of the candidate cells in a same frequency, so that the cell-ranking criteria value for the candidate cells in the same frequency may be lowered.

In various embodiments, a cell (e.g., a BS or a gNB) may broadcast an offset value. This offset value may be applied to a cell ranking criteria value based on which the UE may determine to select or rank candidate cells. In order to increase the priority of candidate cells in a different frequency than that of a particular cell, the UE may increase the priority of the candidate cells in the different frequency by an offset value applied to a cell-ranking criteria value used in cell selection/reselection. For example, the cell-ranking criteria value may be related to a cell-ranking criterion and the offset value may be applied to the cell-ranking criteria value of the candidate cells in the different frequency, so that the cell-ranking criteria value for the candidate cells in the different frequency may be increased.

In various embodiments, a cell (e.g., a BS or a gNB) may broadcast an offset value. This offset value may be applied in a measurement rule for intra-frequency measurements that is a condition to trigger a UE to perform the intra-frequency measurements. In order to decrease the probability of reselecting to candidate cells in a same frequency as a particular cell, the UE may decrease the probability to trigger the intra-frequency measurements for candidate cells in the same frequency. This may be performed by applying the offset to a value associated with a measurement rule for intra-frequency measurements, so that it is harder for a UE to satisfy the condition associated with intra-frequency measurements for candidate cells in the same frequency. For example, the measurement rule may define a threshold of initiating the intra-frequency measurements. Then, the offset value may be applied to a value associated with the threshold of initiating the intra-frequency measurements to make it harder to be satisfied.

In certain embodiments, a cell (e.g., a BS or a gNB) may broadcast an offset value. This offset value may be applied to a cell ranking criteria value based on which the UE may determine to select or rank candidate cells. These candidate cells may be in other frequencies with equal priority as a particular cell. In order to increase the priority of the candidate cells in the other frequencies with equal priority as the particular cell, the UE may increase the ranking of those candidate cells by an offset applied to a cell-ranking criteria value. For example, the cell-ranking criteria value may be related to a cell-ranking criterion and the offset value may be applied to the cell-ranking criteria value of the candidate cells in the other frequencies with equal priority with the particular cells. Thus, the cell-ranking criteria value for those candidate cells may be increased.

In certain embodiments, a cell (e.g., a BS or a gNB) may broadcast a offset value. This offset value may be applied to inter-frequency and/or inter-radio access technology (RAT) cell reselection criteria. This reselection criteria may dictate the selection of candidate cells in other frequencies and/or inter-RAT with particular cells. In order to increase the probability of selecting candidate cells in other frequencies and/or inter-RAT with particular cells, the UE may decrease the condition to perform the inter-frequency or RAT reselection by an offset. This offset may be applied to an inter-frequency and/or inter-radio access technology (RAT) cell reselection criteria value. Thus, it is easier to satisfy the condition to perform inter-frequency or RAT reselection. For example, the inter-frequency and inter-radio access technology (RAT) cell reselection criteria value may be related to a condition to perform inter-frequency or RAT reselection. The offset value may be applied to an inter-frequency and/or inter-radio access technology (RAT) cell reselection criteria value of particular cells, so that the inter-frequency and/or inter-radio access technology (RAT) cell reselection criteria value of particular cells may be more easily satisfied.

In various embodiments, a cell (e.g., a BS or a gNB) may broadcast an offset value. This offset value may be applied in accordance with a measurement rule for inter-frequency or inter-RAT measurements that is a condition to trigger a UE to perform the inter-frequency or inter-RAT measurements. In order to increase the probability to trigger the inter-frequency or inter-RAT measurements for the candidate cells in other frequencies or RATs different than that of the particular cell, the UE may apply the offset value to a value associated with the probability of reselecting to the candidate cells in the other frequencies or RATs different than that of the particular cell. Thus, it may be easier for a UE to satisfy a condition to perform the inter-frequency or inter-RAT measurements to the candidate cells in the frequencies or RATs different than that of the particular cell. For example, the measurement rule may define a threshold of initiating an inter-frequency or inter-RAT measurement. Then, the offset value may be applied to the measurement rule value of the frequencies or RATs different than that of the particular cell to make it easier to be satisfied.

In various embodiments, in order to decrease the probability to reselect to the candidate cells in same frequency with the particular cell, a UE may bar the candidate cells in the frequency. Thus, UE may not consider the candidate cells in the same frequency as candidate cell. Thus, a process to find a suitable cell may be easier (e.g., with a savings in UE time and power).

In second exemplary embodiments, a PCI collision between neighboring cells and/or the coexistence of multiple PLMNs in a frequency may occur. Thus, a UE may read the system information of those neighboring cells to obtain the cell identity and PLMN information in order to distinguish the neighboring cells. However, reading the system information of all candidate cells may require an undesirable amount of time and power. Thus, a UE may rather read the system information when a PCI collision between neighboring cells and/or the coexistence of multiple PLMNs in a frequency is known. A serving cell (e.g., a cell that a UE is currently camped on) may send an instruction signal to be used by the UE in cell selection/reselection. More specifically, the UE may receive an instruction signal from the serving cell indicating whether to read system information of a neighboring cell. For example, in an idle/inactive mode during cell selection/reselection, the UE may read system information of candidate cells, in order to find a most suitable cell for the UE. Accordingly, the serving cell may send an instruction signal to increase the efficiency of cell selection/reselection and reduce the expenditure of time and power by the UE among neighboring cells, cells within a frequency, and/or cells across different frequencies.

In various embodiments, this instruction signal may include an indication of whether the UE may need to read the system information (e.g., the master information block and/or the system information block) of the neighboring cells. This instruction signal broadcast in the serving cell (e.g., a cell that the UE camps on) may include an indication that there has been a PCI collision between the PCI of the neighbor cells.

In various embodiments, this instruction signal may include an indication of whether the UE is to read the system information (e.g., the master information block and/or the system information block) of all cells within a particular frequency band. This instruction signal broadcast in the serving cell (e.g., the cell that UE camps on) may include an indication that multiple operators share the particular frequency band and/or that there are multiple PLMNs in this particular frequency band.

Accordingly, the UE may read the system information (e.g., the master information block and/or the system information block) of the neighboring cells from the serving cell. If the indication instructs a UE to read the system information of the neighboring cells, the UE may obtain and read the system information from the indicated neighboring cells. In certain embodiments, the indication may indicate that the UE may read the system information of a neighboring cell. This may occur, for example, when the indication indicates that the UE is to read the system information of a PCI to get a cell identity or PLMN information. As another example, a UE may obtain system information and get the cell identity or PLMN information based on a detected PCI.

In certain embodiments, the indication may indicate that a UE is to read the system information of cells in a particular frequency. Stated another way, the indication may indicate that the UE is to read the system information and to get the cell identity or PLMN information of cells in a frequency. Thus, the UE may obtain the system information and get the cell identity or PLMN information of cells in the frequency.

In various embodiments, the instruction signal may be provided by a serving cell. In particular embodiments, the instruction signal may be provided by a serving cell via an RRC message to the UE entering into an idle/inactive mode.

In third exemplary embodiments, a UE may be configured to determine an anchor frequency resource based on a number of paging frames and/or a number of paging occasions associated with the UE. Also, the UE may determine whether a frequency resource is to be used for paging among a predetermined set of possible frequency resources for paging in a sequential manner starting with the anchor frequency resource.

For example, UEs may monitor for paging messages while in an idle/inactive mode. In order to increase the paging capacity of various UEs, the UEs may be divided into different groups to monitor different paging occasions (POs) based on UE identifiers (ID), such as a UE ID determined by international mobile subscriber identity (IMSI).

In the unlicensed spectrum, more frequency resource can be utilized than in a licensed spectrum. Furthermore, in order to enhance the effective usage of frequency resources, a UE can be distributed to different sub-bands or bandwidth parts (BWP). Stated another way, in a PO, UEs may be divided into different groups to monitor different sub-bands and/or BWPs. The mapping between UEs and their respective groups may be based on UE ID as well as the respective bandwidth capabilities of each UE.

For example, there may be N frequency resources (such as BWP, subband, and/or PDCCH resources) used for paging transmission in a PO. Also, the UEs monitoring for paging in the PO may first determine an anchor frequency resource. Then, the UE may begin to monitor for respective frequencies starting with the anchor frequency resource. For example, the anchor frequency resource may be determined to be a highest, lowest, and/or middle frequency among the frequencies that the UE may monitor for paging in in a PO.

In certain embodiments, UEs with a UE_ID may monitor for paging in a PO. In this PO, anchor frequency resources may be associated with an anchor frequency index value. Each anchor frequency index value may be represented as the variable "i", and be determined by the following equation:

$$i = \text{Floor}(UE\_ID/(Nn*Ns)) \bmod N \quad (1)$$

where Nn is the number of total paging frames in a directional discontinuous reception (DRX) cycle of the UE, and Ns is a number of paging occasions for the PO.

In various embodiments, the anchor frequency index value "i" may be determined by the following equation:

$$i = \text{floor}(UE\_ID/(Nn*Ns)) \bmod W \quad (2)$$

where W may represent a total weight of all frequency resources (e.g., $W=W(0)+W(1)+ \ldots +W(N-1)$, where $W<W(0)+W(1)+ \ldots +W(i)$ and W(n) is a weight for frequency resources n). Changes in the weight value may be configured or broadcast by a serving cell, or indicated via downlink control information (DCI) or a MAC control element (CE) in the PO. The serving cell may determine the value of W based on the contention and load. In further embodiments, W(n) may be determined by the UE. For example, the UE may perform measurements on each frequency resource (e.g., within a BWP and/or a subband) based on the supported bandwidth of both the UE and the serving cell to and obtain contention information, such as a received signal strength indicator (RSSI) and channel occupancy. The measurement results may be mapped into a weight value where heavier contention may mean a lower weight.

In certain embodiments, the supported bandwidth can be represented with M frequency resources (M<=N) and the anchor frequency resource may be a starting resource to begin monitoring in a PO. In such embodiments, a UE may begin to monitor for paging in the following sequence by starting with i, then i+1 (e.g., then incrementing the index value by 1), until i+M−1 (e.g., when i+M−1<=N). Alternatively, the UE may begin to monitor for paging in the following sequence by starting with i, then i+1 (e.g., then incrementing the index value by 1) until N−1 (e.g., when i+M−1>N). Alternatively, the UE can try to monitor the paging in all supported bandwidths, such as by starting with the frequency resource at i−(N−M), then then incrementing the index value by 1 until N−1 (e.g., when i+M−1>N).

In various embodiments, the supported bandwidth can be represented with M frequency resources (M<=N), and the anchor frequency resource is deemed as a middle point for monitoring in a PO. Then, the UE may begin to monitor for paging in the following sequence by starting with the frequency resource at i−M/2, and then incrementing the index value by 1 until i+M/2−1 (e.g., when i+M/2−1<=N and i−M/2>0). Alternatively, the UE may begin to monitor for paging in the following sequence by starting with the frequency resource at i−M/2, and then incrementing the index value by 1 until N−1 (e.g., when i+M/2−1>N and i−M/2>0). Alternatively, the UE may begin to monitor for paging in the following sequence by starting with the frequency resource at an index value of 0, and then incrementing the index value by 1 until i+M/2−1 (e.g., when i+M/2−1<=N and i−M/2<=0). Alternatively, the UE may begin to monitor for paging in the following sequence by starting with the frequency resource at an index value of 0, and then incrementing the index value by 1 until N−1 (e.g., when i+M/2−1>N and i−M/2<0). Alternatively, the UE may begin to monitor for paging in the following sequence by starting with the frequency resource at an index value of 0, and then incrementing the index value by 1 until M−1 (e.g., when i−M/2<=0). Alternatively, the UE may begin to monitor for paging in the following sequence by starting with the frequency resource at an index value of i−(N−M), and then incrementing the index value by 1 until N−1 (e.g., when i+M/2−1>N).

In fourth exemplary embodiments, the UE may send, to a candidate cell or a serving cell, a supported band and a supported bandwidth for the UE in the idle/inactive mode. In further embodiments, the serving cell may forward the supported band and/or supported bandwidth, via the core network, to a candidate cell in a UE capability transfer procedure. This candidate cell may be a candidate cell that the UE is about to camp on.

In various embodiments, a candidate cell may not have information concerning a UE in an idle/inactive mode except for information provided by a core network that the candidate cell is part of. Accordingly, the UE may report radio capability information while in the idle/inactive mode to the UE's serving cell during a UE capability transfer procedure. The radio capability information may include a supported band and a supported bandwidth of the UE in the idle/inactive mode. Then, the serving cell may send the radio capability information to the core network during a UE radio capability information indication or UE radio capability check, and/or an initial context setup procedure. Thus, in order to support different UEs with different bandwidths, the core network may send the received radio capability information to all candidate cells and/or to the candidate cell that the UE is about to camp on.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a communication device, comprising:
   receiving information from a first communication node;
   determining, based on the information from the first communication node, whether the first communication node is associated with a different public land mobile network, PLMN, identifier than that of the communication device; and
   in response to the first communication node being associated with a different PLMN identifier than that of the communication device;
   associating a lowest priority value, which is associated with a frequency for cell selection and reselection, to a second communication node in communication node reselection, wherein the second communication node, when assigned with the lowest priority value, is not barred from candidate cells for cell selection and reselection, and still has a chance to be selected by the communication device for cell selection and reselection.

2. The method of claim 1, further comprising:
   barring the second communication node, from communication node selection or reselection.

3. The method of claim 1, wherein the second communication node is in a same frequency with the first communication node.

4. A device comprising a memory for storing computer instructions and a processor in communication with the memory, wherein, when the processor executes the computer instructions, the processor is configured to cause the device to:
   receive information from a first communication node;
   determine, based on the information from the first communication node, whether the first communication node is associated with a different public land mobile network, PLMN, identifier than that of the device; and
   in response to the first communication node being associated with a different PLMN identifier than that of the device:
   associate a lowest priority value, which is associated with a frequency for cell selection and reselection, to a second communication node in communication node reselection, wherein the second communication node, when assigned with the lowest priority value, is not barred from candidate cells for cell selection and reselection, and still has a chance to be selected by the device for cell selection and reselection.

5. The device according to claim 4, wherein, when the processor executes the computer instructions, the processor is configured to further cause the device to:
   bar the second communication node from communication node selection or reselection.

6. The device of claim 4, wherein the second communication node is in a same frequency with the first communication node.

7. A method performed by a first communication node, comprising:
   generating system information comprising public land mobile network (PLMN) information of the first communication node; and
   transmitting the system information to a communication device,
   wherein when the PLMN information indicates to the communication device that the communication device is associated with a different PLMN identifier than that of the first communication node, the system information triggers the communication device to associate a lowest priority value, which is associated with a frequency for cell selection and reselection, to a second communication node in communication node reselection, wherein the second communication node, when assigned with the lowest priority value, is not barred from candidate cells for cell selection and reselection, and still has a chance to be selected by the communication device for cell selection and reselection.

8. The method according to claim 7, wherein the second communication node is in a same frequency with the first communication node.

9. A first communication node comprising a memory for storing computer instructions and a processor in communication with the memory, wherein, when the processor executes the computer instructions, the processor is configured to cause the first communication node to:
   generate system information comprising public land mobile network (PLMN) information of the first communication node; and
   transmit the system information to a communication device,
   wherein when the PLMN information indicates to the communication device that the communication device is associated with a different PLMN identifier than that of the first communication node, the system information triggers the communication device to associate a lowest priority value, which is associated with a frequency for cell selection and reselection, to a second communication node in communication node reselection, wherein the second communication node, when assigned with the lowest priority value, is not barred from candidate cells for cell selection and reselection, and still has a chance to be selected by the communication device for cell selection and reselection.

10. The first communication node according to claim 9, wherein the second communication node is in a same frequency with the first communication node.

* * * * *